United States Patent [19]

Holmes

[11] Patent Number: 4,531,430
[45] Date of Patent: Jul. 30, 1985

[54] THROTTLE MODULATOR

[75] Inventor: Russell C. Holmes, Troy, Mich.

[73] Assignee: Eaton Corporation, Cleveland, Ohio

[21] Appl. No.: 453,668

[22] Filed: Dec. 27, 1982

[51] Int. Cl.³ .................. B60K 41/04; F02D 11/04
[52] U.S. Cl. ................................ 74/858; 123/396
[58] Field of Search ............... 74/858, 860, 872, 874;
192/0.052, 0.075, 0.08, 0.092; 123/396, 342, 360, 376

[56] References Cited

U.S. PATENT DOCUMENTS

| | | | |
|---|---|---|---|
| 2,118,978 | 5/1938 | Maybach | 74/858 |
| 2,348,435 | 5/1944 | Hey et al. | 74/872 X |
| 2,580,107 | 12/1951 | Long | 192/0.07 |
| 2,587,892 | 3/1952 | Price | 192/0.073 |
| 2,601,628 | 6/1952 | Price | 74/472 |
| 2,605,874 | 8/1952 | Price | 192/0.092 |
| 2,626,690 | 1/1953 | Price | 74/858 X |
| 2,631,703 | 3/1953 | Ainsworth | 74/858 X |
| 2,637,216 | 5/1953 | Price | 74/858 |
| 2,637,425 | 5/1953 | Long et al. | 74/858 |
| 3,225,617 | 12/1965 | Young | 74/858 |
| 3,814,224 | 6/1974 | Podssuweit et al. | 74/858 X |
| 4,455,978 | 6/1984 | Atago et al. | 123/376 X |
| 4,473,049 | 9/1984 | Jahr | 123/396 |
| 4,474,083 | 10/1984 | Braun | 74/867 |

FOREIGN PATENT DOCUMENTS

| | | | |
|---|---|---|---|
| 944908 | 6/1956 | Fed. Rep. of Germany | 123/396 |
| 208235 | 8/1959 | Fed. Rep. of Germany | 192/0.092 |
| 990794 | 6/1951 | France | 123/396 |
| 1059963 | 3/1954 | France | 123/396 |
| 1336732 | 12/1963 | France | 74/858 |
| 633781 | 7/1947 | United Kingdom | 74/858 |
| 780767 | 8/1957 | United Kingdom | 74/858 |
| 2018917 | 10/1979 | United Kingdom | 74/858 |
| 1573097 | 8/1980 | United Kingdom | 74/858 |
| 2068456 | 8/1981 | United Kingdom | 123/396 |

*Primary Examiner*—George H. Krizmanich
*Assistant Examiner*—Dirk Wright
*Attorney, Agent, or Firm*—C. H. Grace; P. S. Rulon

[57] ABSTRACT

A throttle modulation mechanism (10) is disposed between a throttle pedal (18) and a fuel control device (12) for an unshown engine. Mechanism (10) is operable during shifting modes of an unshown transmission driven by the engine to dip and boost fuel delivery to the engine for synchronizing the transmission and/or reducing shifting shocks. Mechanism (10), which is controlled by a transmission logic (14), includes a lever (16) pivotally connected at one end (16a) to link (28), at the other end (16c) to a throttle dip actuator (20), and in the middle (16b) to the fuel control via a link (30) and to a throttle boost actuator (22) via a piston rod (32). The actuators are positioned by fluid pressure in response to logic signals applied to solenoid valves (24, 26). A second embodiment of the modulation device includes a slotted connector (101a) which negates mechanical and force feedback to the throttle pedal independent of all throttle pedal positions.

14 Claims, 10 Drawing Figures

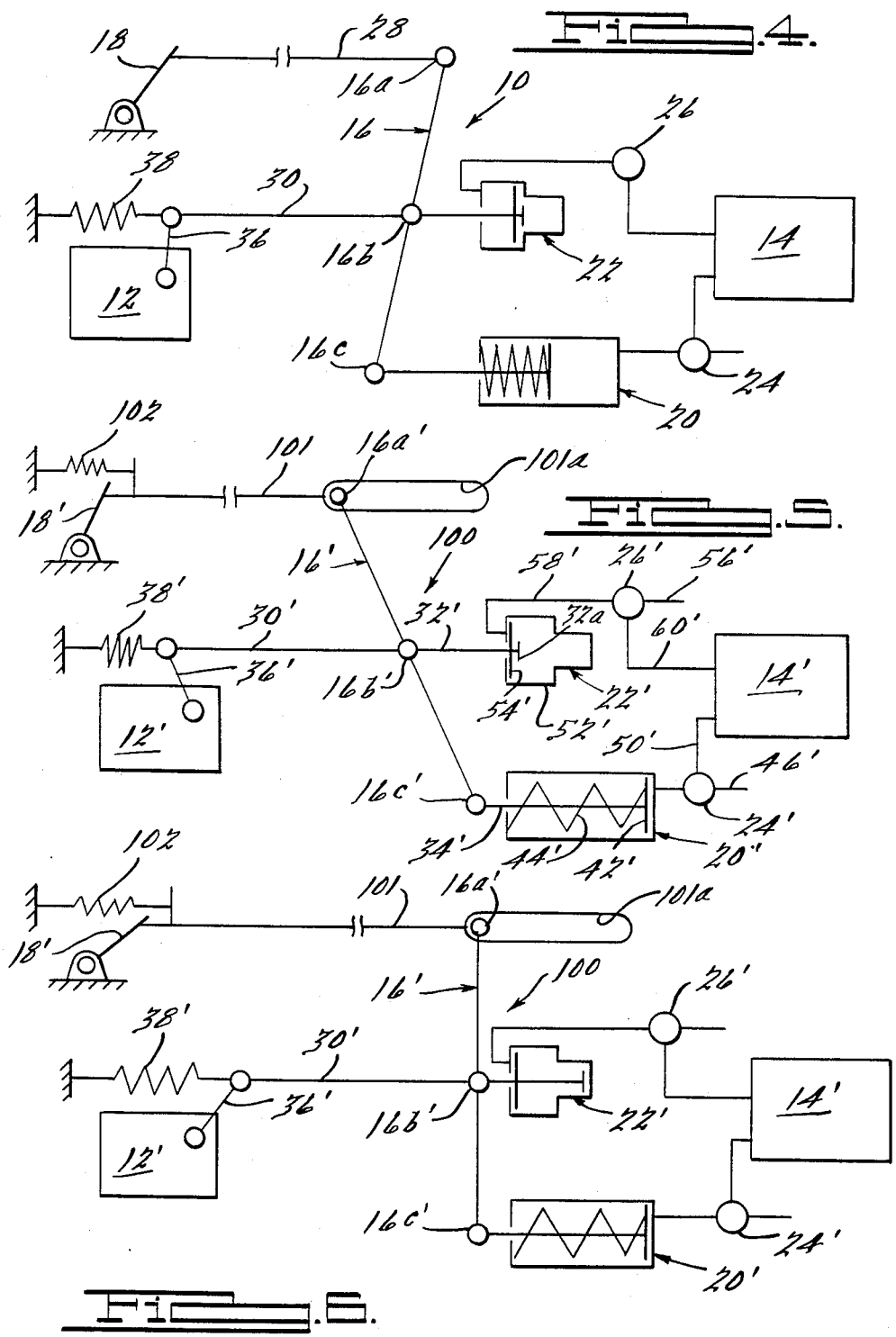

THROTTLE MODULATOR

CROSS-REFERENCE TO RELATED APPLICATIONS

This application is related to U.S. application Nos. 453,541, 453,542, and 453,544 all filed 12-27-82 and all assigned to the assignee of this application.

BACKGROUND OF THE INVENTION

1. Field of the Invention

The present invention relates to a mechanism for automatically modulating fuel delivery to an engine. More specifically, the present invention relates to such a mechanism for synchronizing and/or reducing shifting shocks of a transmission.

2. Description of the Prior Art

It has been previously proposed to automatically modulate or vary the speed of an engine during shifting modes of a transmission in an effort to simulate what is done by an experienced driver during manual shifting. For example, U.S. Pat. No. 3,736,806 proposes increasing fuel delivery to an engine during manual shifting of a mechanical transmission; U.S. Pat. No. 3,834,499 proposes both increasing and decreasing fuel delivery to an engine during automatic shifting of a mechanical transmission; and U.S. Pat. No. 4,226,141 proposes decreasing fuel delivery to an engine during automatic shifting of a transmission to facilitate synchronization of the transmission and to reduce shifting shocks.

The prior art mechanisms for modulating engine speed during shifting modes of a transmission have had several disadvantages. Most have been on/off type mechanisms which have not provided smooth, precise changes in engine speed and torque and, therefore, have provided less than optimum synchronizing and shift shock results. Some have been incorporated directly into fuel control devices and therefore have required complex and costly redesign of the fuel control devices. Some have operated directly on throttle pedal linkages with resulting mechanical feedback or physical movement of the throttle pedal. This feedback or movement, which is noticed by the operator, is disagreeable and interferes with proper and effective control of the vehicle.

Further, with respect to optimum synchronizing and shift shock, the prior art mechanisms have not readily provided the many different precise degrees of fuel delivery change necessary during shifting modes of a transmission. For example, precisely regulated, ramped, incremental increases and decreases of fuel delivery can greatly reduce shifting shocks felt by a vehicle operator, reduce torsional oscillations in the vehicle drivetrain, reduce synchronizing time, reduce energy consumed by synchronizing devices, and reduce impulse forces on jaw clutches.

SUMMARY OF THE INVENTION

An object of this invention is to provide a mechanism for controlling fuel delivery to a prime mover independent of throttle pedal position during shifting of a transmission driven by the prime mover.

Another object of this invention is to provide such a mechanism for controlling shifting shocks.

Another object of this invention is to provide such a mechanism for effecting synchronism in an automatic mechanical transmission.

According to a feature of the invention, the mechanism of the present invention is adapted to be interposed between an engine throttle pedal and an engine fuel control device such as a throttle valve or a fuel injection device. The mechanism comprises moveable means including a first portion adapted for movement in response to movement of the throttle pedal, a second portion adapted to be connected with the fuel control device for slaved movement therewith, and a third portion; and actuator means for moving the third portion of the moveable means such that the second portion moves to vary the fuel control delivery independent of throttle pedal position during shifting modes of the transmission.

According to another feature of the invention the mechanism, as adapted in the previous feature, including a rigid member having a first portion at one end adapted for movement between fuel increasing and decreasing positions by the throttle pedal, a second portion disposed between the ends of the member and slaved for movement with the fuel control device, and a third portion at the other end of the member mounted for pivotal movement on an actuator operative to move the third portion between first and second positions.

BRIEF DESCRIPTION OF THE DRAWINGS

The throttle modulation mechanism of the present invention is shown in the accompanying drawings in which:

FIGS. 2-4 respectively illustrate the mechanism of FIG. 1 in a wide-open throttle position, a throttle dip position, and a throttle boost position;

FIG. 5 schematically illustrates a modified form of the modulation mechanism connected between a throttle pedal and a fuel control device with the mechanism in the idle throttle position; and FIGS. 6-10 respectively illustrate the mechanism of FIG. 5 in a wide-open throttle position, a throttle dip position with the throttle pedal at idle, a throttle boost position with the throttle at idle, a throttle dip position with the throttle pedal at part throttle, and a throttle boost position with the throttle pedal at part throttle.

Certain terminology referring to proposed environment, direction, and motion will be used in the following description. This terminology is for convenience and clarity in describing the invention and should not be considered limiting in the appended claims unless the claims are explicitly so limited.

DETAILED DESCRIPTION OF FIGS. 1-4

Figure 1:
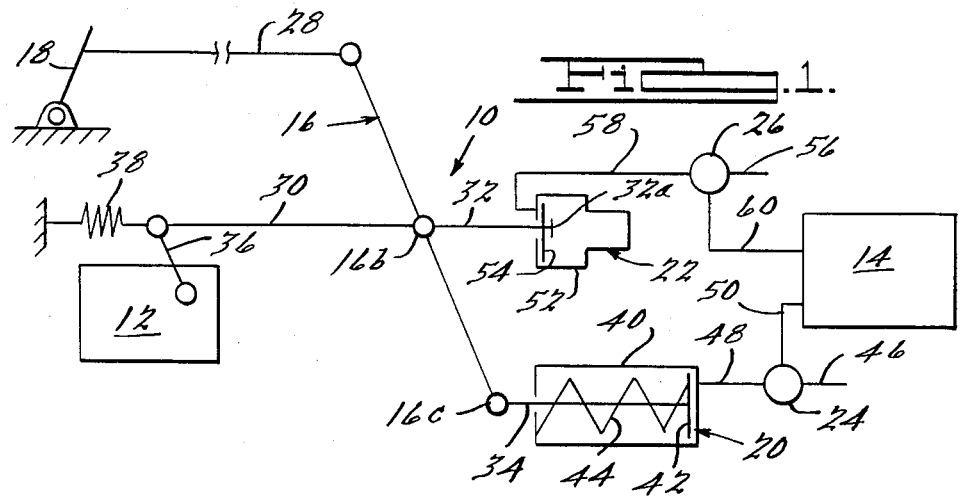
FIG. 1 schematically illustrates the modulation mechanism connected between a throttle pedal and a fuel control device with the mechanism in the idle throttle position.

FIG. 1 schematically shows a single lever throttle modulation mechanism 10 for automatically decreasing and increasing fuel delivery from a fuel control device 12 to an unshown prime mover in response to signals from a transmission logic 14 during shifting modes of an unshown transmission driven by the prime mover. Mechanism 10 is contemplated for use in a wheeled vehicle such as a truck. The prime mover may be of any adaptable type, e.g. the prime mover may be an engine of the Otto or Diesel cycle type. The transmission may also be of any multiple ratio type, e.g., a manually shifted transmission employing positive or jaw-type clutches to effect ratio changes, an automatically shifted transmission employing friction clutches to effect ratio changes, or an automatically shifted transmission employing positive clutches to effect ratio changes. Mechanism 10 is contemplated for use with this latter type of transmission, which is often referred to as an automatic mechanical transmission. Such a transmission and logic system for controlling shifting is disclosed in U.S. Pat. No. 4,361,060 which issued Nov. 30, 1982. U.S. Pat. No. 4,361,060 is incorporated herein by reference.

Mechanism 10 includes a rigid member or single lever 16 mechanically interposed between fuel control device 12 and an operator-controlled throttle pedal 18, a throttle dip actuator 20, a throttle boost actuator 22, and solenoid valves 24, 26 for controlling the actuators. Member 16 includes a first portion 16a at one end pivotally connected to a link 28 moved in direct response to the position of the throttle pedal, a second portion 16b pivotally connected to a link 30 and to a piston rod 32, and a third portion 16c at the other end of the member pivotally 16c connected to a piston rod 34. The left end of link 30 is pivotally connected to a lever 36 which varies fuel flow to the engine in response to translatory movement of portion 16b of member 16 in the direction of the axis of link 30. A spring 38 biases link 30 and lever 36 toward the idle or reduced fuel delivery position as seen in FIG. 1.

Figure 2:
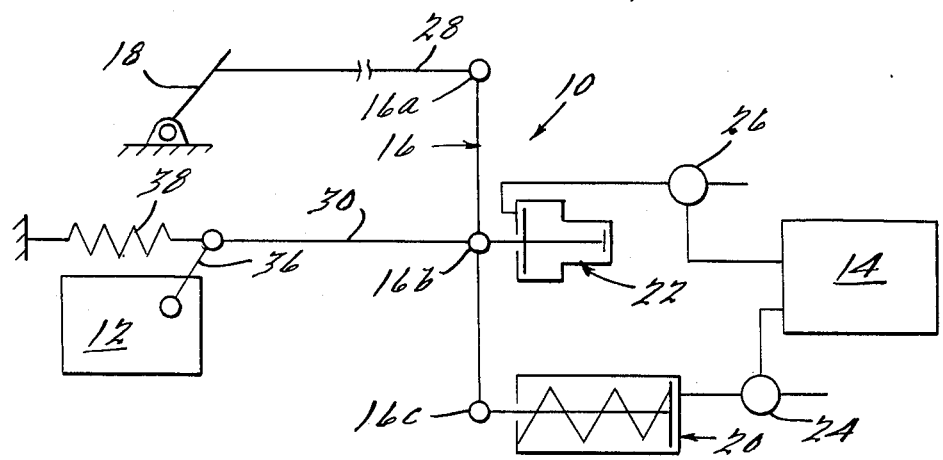

Dip actuator 20 includes a cylinder housing 40, a piston 42 fixed to the rod 34, and a spring 44 biasing the piston to the right or to a first position, as seen in FIGS. 1 and 2, with a force greater than the force of spring 38. Piston 42 is moved to the left or toward a second position by pressurized fluid controlled by electrically operated valve 24. Valve 24 is connecterd to an unshown source of pressurized fluid, such as air, by a conduit 46 and to cylinder housing 40 by a conduit 48. Valve 24 is electrically connected to logic 14 via a wire 50.

Figure 3:
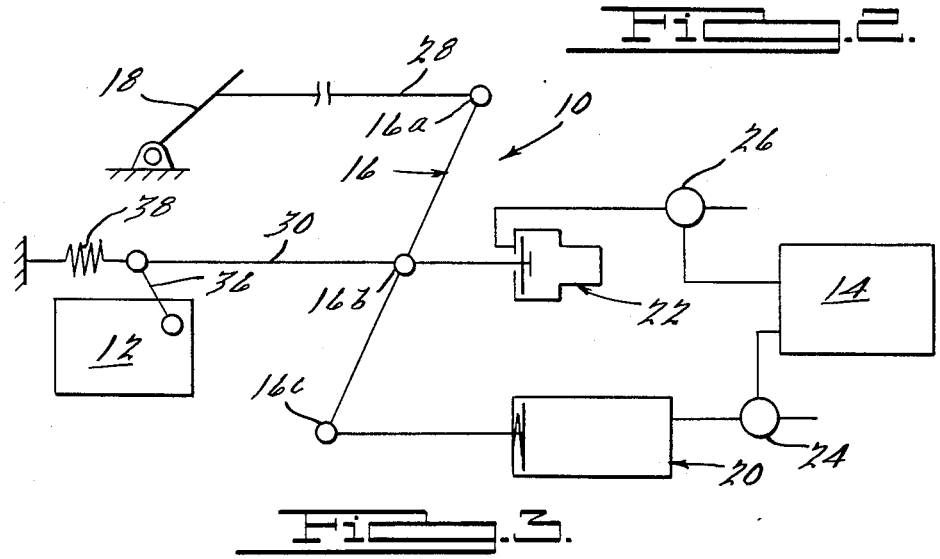

During shifting modes of the transmission, logic 14 energizes valves 24, 26 in predetermined sequences to change the position of fuel control lever 36 independent of throttle pedal position. Dip actuator 20 is actuated to effect a dip or decrease in fuel flow, as shown in FIG. 3, and boost actuator 2 is actuated to effect a boost or increase in fuel flow, as shown in FIG. 4. For example, to decrease fuel flow with throttle pedal 18 in the wide-open throttle position of FIG. 2, dip actuator 20 is actuated to the second or leftward position, as shown in FIG. 3, to effect clockwise rotation of member 16 about the fulcrum or pivot connection at first portion 16a with substantially no mechanical or force feedback to throttle pedal 18. Further, while throttle pedal 18 is still in the wide-open position, subsequent actuation of boost actuator 22 to the right, while selectively venting dip actuator 20, will rotate member 16 counterclockwise about first portion 16a to effect a boost or increase in fuel flow.

Boost actuator 22 includes a cylinder housing 52, a piston 54 slidably mounted on rod 32, and a stop 32a fixed to the rod for limiting rightward movement of the piston on the rod. Valve 26 is substantially identical to valve 24 and is connected to the source of pressurized fluid by a conduit 56 and to cylinder housing 52 by a conduit 58. Valve 24 is electrically connected to logic 14 via a wire 60.

During nonshifting modes of the transmission, actuators 20, 22 are vented to atmosphere. Therefore, dip actuator 20 remains in the first or rightward position since the force of spring 44 acting on piston 42 is greater than the force of spring 38 acting on link 30, and boost actuator allows free movement of member 16 since piston rod 32 is slidably mounted in piston 54. Hence, while throttle pedal 18 is moved between the idle throttle pedal position of FIG. 1 and the wide-open throttle pedal position of FIG. 2, member 16 pivots about the fulcrum provided by the pivot connection at third portion 16c, whereby second portion 16b moves an amount proportional to the movement of portion 16a to effect movement of fuel control lever 36 between the idle throttle position of FIG. 1 and the wide-open throttle position of FIG. 2.

Valves 24, 26 may be of the nonpressure regulating type which either vent or apply full fluid pressure to the cylinders in response to the presence or absence of electrical signals from logic 14, whereby the cylinder pistons are either fully actuated or unactuated. Valves 24, 26 are preferably of the pressure regulating type which control the pressure of the fluid to and from the cylinders, thereby controlling the piston position and rate of movement. Further, valves 24, 26 may each be replaced by two or more valves controlled by the logic. Such valves and logics for controlling them are well-known, e.g., the valves may be responsive to amplitude or duty cycle modulated signals from the logic. One valve could be energized to vent its associated cylinder and the other to port fluid pressure to its associated cylinder.

DETAILED DESCRIPTION OF FIGS. 5-10

FIGS. 5-10 disclose a modified throttle modulation mechanisn 100. Components of the embodiment in FIGS. 5-10, which are the same as those in the embodiment of FIGS. 1-4, are identified by like numerals with a prime suffix added. Accordingly, only added or modified components will be described in detail. The embodiment of FIGS. 5-10 differs from the embodiment of FIGS. 1-4 principally with respect to the connection between the throttle pedal and the pivotal member or lever. The link 28 of FIGS. 1-4 is replaced by a link 101 having a slotted connection 101a which receives first portion 16a' of member 16' for sliding and pivotal movement therein. Further, a spring 102 is added to bias link 101 and slotted connection 101a toward the idle or reduced fuel flow position. Spring 102 may be attached directly to throttle pedal 18' in which case link 101 and slotted connector 101a would not be acted on by the spring unless link 101 were secured to the throttle pedal.

Figure 7:
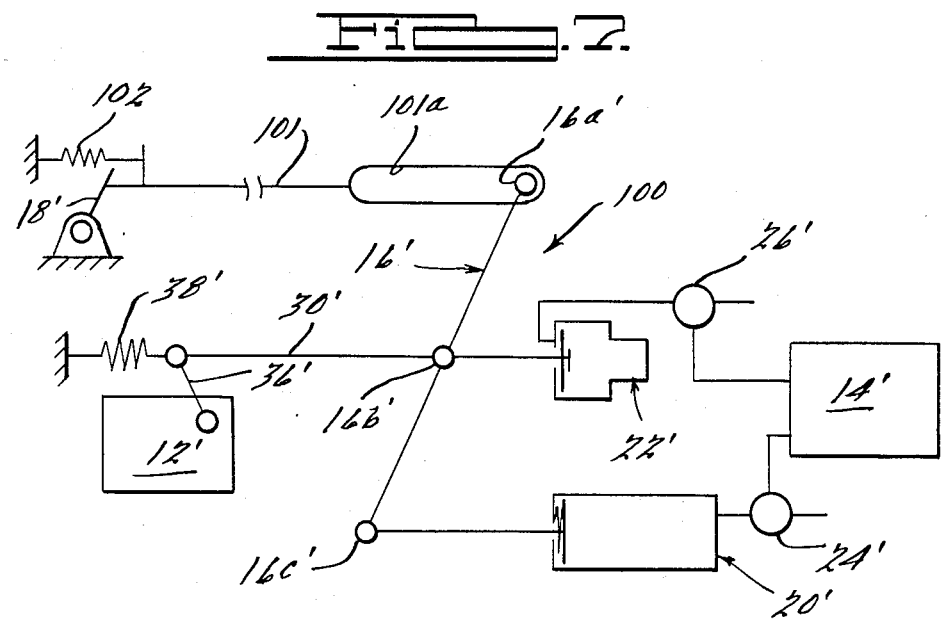
Figure 8:
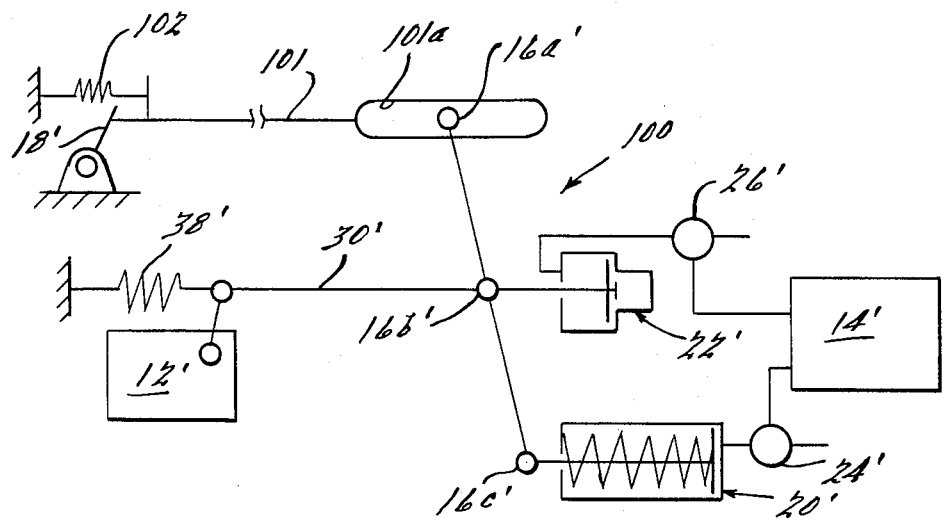
Figure 9:
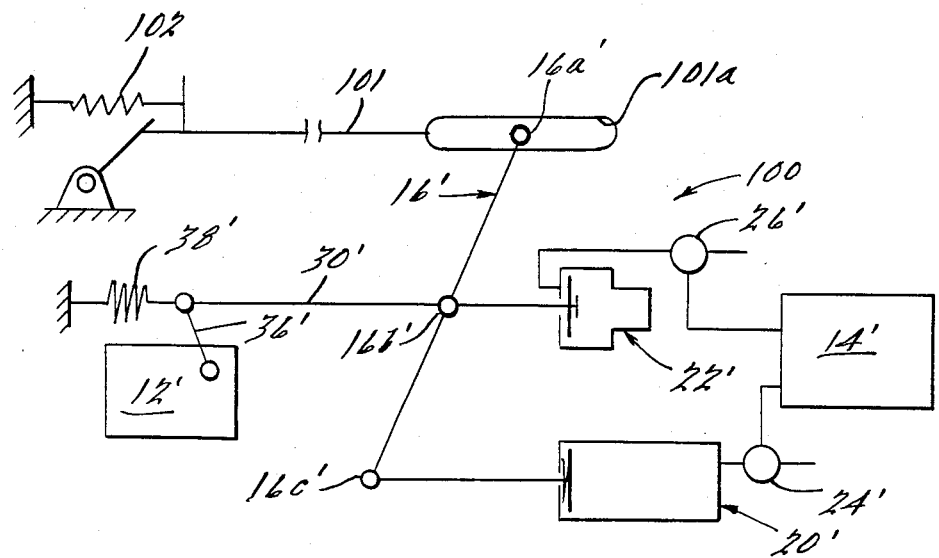
Figure 10:
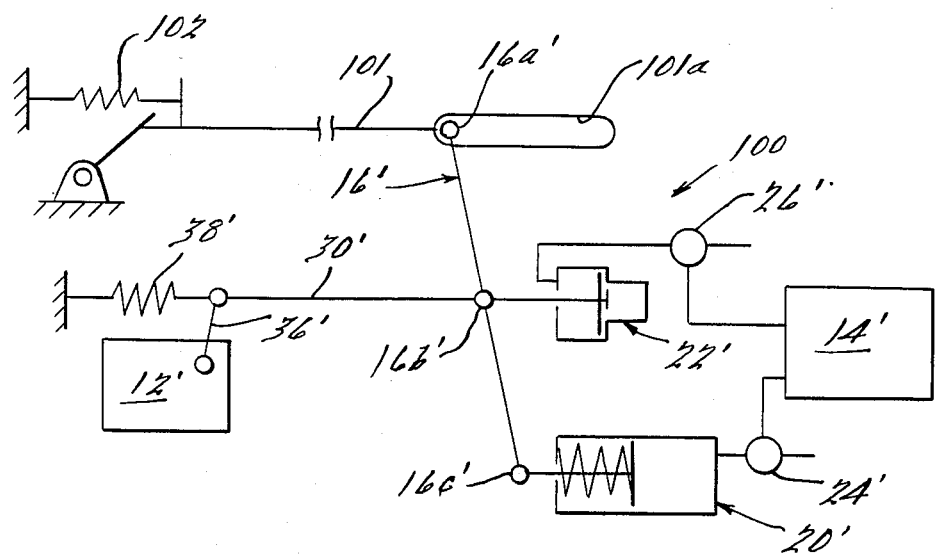

The addition of slotted connector 101a to the modulator mechanism of FIGS. 5-10 provides a significant advantage over the modulator mechanism of FIGS. 1-4. With the embodiment of FIGS. 1-4 substantially no mechanical or force feedback to the throttle pedal is possible only when the throttle pedal is at or near the wide-open throttle pedal position. With the embodiment of FIGS. 5-10, mechanical or force feedback to the throttle pedal is substantially avoided whether the throttle pedal is in the idle throttle pedal position of FIGS. 5, 7 and 8, the wide-open throttle pedal position of FIG. 6, or the part throttle pedal position of FIGS. 9 and 10. Throttle modulation while the throttle pedal is in the wide-open throttle position of FIG. 6 is substantially the same as previously discussed with respect to FIGS. 3 and 4 and therefore should require no further explanation. Throttle modulation with the throttle pedal in the idle throttle position, as shown in FIGS. 7 and 8, is as follows: when dip actuator 20' is actuated leftward to the second position, FIG. 7, first portion 16a' moves rightward the full length of slotted connector 101a without any mechanical or force feedback to the throttle pedal and without any translatory movement of second portion 16b'. When boost actuator 22' is actuated rightward and dip actuator 20' is fully deactuated, FIG. 8 second portion 16b' moves rightward to increase or boost fuel flow while first portion 16a' moves to an intermediate position within the slotted connector. Throttle modulation with the throttle pedal in a part throttle position, as shown in FIGS. 9 and 10, is as follows: when dip actuator 20' is actuated leftward to the second position, FIG. 9, first portion 16a' moves rightward toward an intermediate position within the slotted connector while spring 38' moves second portion 16b' leftward to decrease fuel flow. When boost actuator 22' is actuated rightward and dip actuator 20' is fully deactuated, FIG. 10, second portion 16b' moves rightward to increase fuel flow while first portion 16a' moves to a position adjacent the left end of the slotted connector.

Operation

To describe operation, it will be assumed that mechanism 10 is in a wheeled vehicle in combination with an automatic mechanical transmission having jaw-type clutches for engaging and disengaging step ratio gears in the transmission and a friction type master clutch interposed between the prime mover and the transmission. The jaw and master clutches are controlled by logic 14. Further, logic 14 maintains the master clutch disengaged when the vehicle is at rest and an unshown switch indicates that throttle pedal is in the idle position. The transmission may further include devices to assist synchronization of the jaw clutches, e.g., the jaw clutches may each include a synchronizer which effects upshift and downshift synchronization, or retarder and accelerator devices which respectively effect upshift and downshift synchronizing of all of the ratios. The retarder may be a brake connected to the transmission input shaft and the accelerator may be a clutch operative to connect the input shaft with a faster rotating member. Such retarder and accelerator devices are well-known in the art and are readily made responsive to signals from a logic. Further, size, wear, and effectiveness of all of these devices is enhanced by mechanism 10 since the amount of torque they would often have to handle is decreased by throttle modulation.

Assuming now that the transmission shift selector is in a forward drive position with the throttle pedal in the idle position and the vehicle at rest, the master clutch is therefor disengaged and a starting ratio gear is engaged. When the throttle pedal is depressed, the master clutch is engaged at a rate determined by throttle pedal position and other known parameters. When the vehicle reaches a speed determined by throttle position and other parameters, logic 14 initiates an upshift mode; at this time the throttle pedal may be at any position between idle, as shown in FIG. 1, and up to and including wide-open throttle, as shown in FIG. 2. The upshift mode may comprise several different sequences to effect the upshift. Herein is one sequence: logic 14 sends a throttle dip signal to valve 24 via wire 50 to dip the throttle or decrease fuel delivery to the engine, thereby reducing engine torque in the vehicle drivetrain and suspension system at a controlled rate prior to disengagement of the master clutch. Concurrent or substantially concurrent with the throttle dip signal, logic 14 initiates disengagement of the then-engaged jaw clutch, which will not normally move to the disengaged position, until the driveline torque across the jaws diminishes. The logic then initiates disengagement of the master clutch, if the transmission includes a retarder, such as a brake, to reduce input shaft speed for synchronizing the jaw clutch to be engaged for the next upshift ratio. As synchronization is reached, the logic initiates engagement of the jaw clutch and then reengagement of the master clutch at a controlled rate, and then throttle boost by merely venting dip actuator 20 or by venting dip actuator 20 and pressurizing boost actuator 22 to control the rate of engine speed and torque rise commensurate with a smooth shift. Further upshifts are substantially the same.

Downshifts differ principally in that they require an increase in input shaft speed to effect synchronization. When logic 14 senses the need for a downshift, a throttle dip signal is sent to valve 24 via wire 50 as during an upshift. Concurrent or substantially concurrent with the throttle dip signal, logic 14 initiates disengagement of the then-engaged jaw clutch which will not normally move to the disengaged position until the driveline torque across the jaws diminishes. The logic then initiates disengagement of the master clutch. If the transmission includes an accelerator device, as previously mentioned, the device increases the input shaft speed to synchronize the jaw clutch to be engaged while the master clutch remains disengaged; as synchronization is reached, the logic initiates engagement of the jaw clutch and then engagement of the master clutch. If the transmission does not include such a device, logic 14 initates engagement of the master clutch and then throttle boost to effect synchronization by sending a boost signal to valve 26 via wire 60, then disengagement of the master clutch as synchronization is reached and engagement of the jaw clutch, and then reengagement of the master clutch at a controlled rate. This engagement, disengagement, and reengagement of the master clutch during the downshift sequence is the well-known double clutch procedure long practiced by operators of manually shifted transmissions.

Two embodiments of the invention have been disclosed for illustrative purposes. Many variations and modifications of the disclosed embodiments are believed to be within the spirit of the invention. The following claims are intended to cover the inventive portions of the invention and variations and modifications within the spirit of the disclosed invention.

What is claimed is:

1. A mechanism adapted to be interposed between an engine throttle pedal and an engine fuel control device for varying fuel delivery to an engine during shifting modes of a transmission driven by the engine, the mechanism comprising;

a rigid elongated member having first and third end portions each disposed for pivotal and substantially linear movement and a second portion disposed intermediate the first and third portions and adapted to be connected with the fuel control device for varying fuel delivery in response to said linear movement of either end portion, said first portion adapted to be moved linearly and pivoted about the third portion in response to throttle pedal movement; and actuator means operative during shifting modes of the transmission for linearly moving the third portion without changing the position of the throttle pedal and independent of the throttle pedal position.

2. The mechanism of claim 1, wherein said actuator means comprises a first actuator pivotally connected to said third portion and moveable between first and second positions, said member operative when said actuator is in said first position to pivot about the pivot connection in response to movement of the throttle pedal for increasing and decreasing the fuel flow during non-shifting modes of the transmission.

3. The mechanism of claim 2, wherein movement of said actuator from said first position toward said second position linearly moves said third portion and decreases the fuel flow.

4. The mechanism of claim 2, further including a slotted connector adapted for slaved movement with the throttle pedal and wherein said first portion is disposed for sliding and pivotal movement in said slotted connector in response to linear movement of the third portion by said actuator means, thereby providing a lost motion connection between said member and said throttle pedal allowing movement of the member without movement of the throttle pedal.

5. The mechanism of claim 3, wherein said actuator means further comprises a second actuator operative to move said second portion toward a fuel flow increasing position independent of the throttle pedal position.

6. The mechanism of claim 2, further including a first resilient means biasing the second portion toward a decreased fuel delivery position with a force and a second resilient means biasing the third portion toward said first position with a force greater than the force of the first resilient means.

7. In a vehicle having ground engaging wheel driven by a multiple, step ratio transmission connected to a combustion engine; an operator-controlled throttle pedal for varying fuel delivery to the engine by a fuel control device; and an improved mechanism for varying the fuel delivery independent of the throttle pedal position during shifting modes of the transmission; the improved mechanism comprising:

a rigid elongated member having first and third end portions each disposed for pivotal and substantially linear movement and a second portion disposed intermediate the first and third portions and connected with the fuel control device for varying fuel delivery in response to said linear movement of either end portion, said first portion moved linearly and pivoted about the third portion in direct response to throttle pedal movement; and actuator means operative during shifting modes of the transmission for linearly moving the third portion without changing the position of the throttle pedal and independent of the throttle pedal position.

8. The mechanism of claim 7, wherein said actuator means comprises a first actuator pivotally connected to said third portion and moveable between first and second positions, said member operative when said actuator is in said first position to pivot about the pivot connection in response to movement of the throttle pedal for increasing and decreasing the fuel flow during non-shifting modes of the transmission.

9. The mechanism of claim 8, wherein movement of said actuator from said first position toward said second position linearly moves said third portion and decreases the fuel flow.

10. The mechanism of claim 9, wherein said actuator means further comprise a second actuator operative to move said third portion from said second position toward said first position for increasing the fuel flow independent of the throttle pedal position.

11. The mechanism of claim 8, further including a slotted connector adapted for slaved movement with the throttle pedal and wherein said first portion is disposed for sliding and pivotal movement in said slotted connector in response to linear movement of the third portion by said actuator means, thereby providing a lost motion connection between said member and said throttle pedal allowing movement of the member without movement of the throttle pedal.

12. The mechanism of claim 8, further including a first resilient means biasing the second portion toward a decreased fuel delivery position with a force and a second resilient means biasing the third portion toward said first position with a force greater than the force of the first resilient means.

13. The mechanism of claim 12, further including resilient means biasing the throttle pedal toward a decreased fuel delivery position independent of the position of said rigid member.

14. The mechanism of claim 13, wherein said actuator means further comprises a second actuator operative to move said second portion toward a fuel flow increasing position independent of the throttle pedal position.

* * * * *